United States Patent
Gill

(10) Patent No.: US 6,219,209 B1
(45) Date of Patent: Apr. 17, 2001

(54) SPIN VALVE HEAD WITH MULTIPLE ANTIPARALLEL COUPLING LAYERS

(75) Inventor: Hardayal (Harry) Singh Gill, Portola Valley, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/364,327

(22) Filed: Jul. 29, 1999

(51) Int. Cl.[7] .................................................. G11B 5/39
(52) U.S. Cl. ........................................................ 360/324.11
(58) Field of Search ............................ 360/324.1, 324.11, 360/324.12

(56) References Cited

U.S. PATENT DOCUMENTS

| | | | |
|---|---|---|---|
| 5,206,590 | 4/1993 | Dieny et al. | 324/252 |
| 5,828,529 | 10/1998 | Gill | 360/113 |
| 5,880,913 | * 3/1999 | Gill | 360/113 |
| 5,898,549 | * 4/1999 | Gill | 360/113 |
| 5,955,211 | * 9/1999 | Maeda et al. | 428/692 |
| 6,034,845 | * 3/2000 | Nagasaka et al. | 360/113 |
| 6,038,107 | * 3/2000 | Pinarbasi | 360/113 |
| 6,040,961 | * 3/2000 | Gill | 360/113 |
| 6,051,309 | * 4/2000 | Fujikata et al. | 428/332 |
| 6,052,263 | * 4/2000 | Gill | 360/113 |
| 6,117,569 | * 9/2000 | Lin et al. | 428/692 |
| 6,122,150 | * 9/2000 | Gill | 360/324.11 |
| 6,127,053 | * 10/2000 | Lin et al. | 428/692 |
| 6,134,090 | * 10/2000 | Mao et al. | 360/324.1 |

* cited by examiner

Primary Examiner—Jefferson Evans
(74) Attorney, Agent, or Firm—William D. Gill

(57) ABSTRACT

An antiparallel (AP)-pinned spin valve (SV) sensor is provided which has positive and negative read signal symmetry about a zero bias point of a transfer curve upon sensing positive and negative magnetic incursions of equal magnitude from a moving magnetic medium. The SV sensor includes a ferromagnetic free layer which has a magnetic moment which is free to rotate in first and second directions from a position which corresponds to the zero bias point upon sensing positive and negative magnetic incursions, respectively, an AP-pinned layer, an antiferromagnetic layer which pins the magnetic moment of the AP-pinned layer along a pinned direction, and a spacer layer sandwiched between the AP-pinned layer and the free layer. The AP-pinned layer includes at least two antiparallel coupling (APC) layers made of ruthenium interleaved between ferromagnetic pinned layers in order to effectively increase the ruthenium thickness while avoiding a decrease in the antiferromagnetic coupling between the ferromagnetic pinned layers. With this AP-pinned layer structure, the forces on the free layer that influence the bias point on the sensor transfer curve are oriented so that the combined effects of a demagnetization field and a sense current field are counterbalanced by the combined effects of an anisotropic magnetoresistive effect and a ferromagnetic coupling field resulting in near zero asymmetry of the read signal.

36 Claims, 8 Drawing Sheets

SPIN VALVE HEAD WITH MULTIPLE ANTIPARALLEL COUPLING LAYERS

BACKGROUND OF THE INVENTION

1. Field of the Invention

This invention relates in general to spin valve magnetoresistive sensors for reading information signals from a magnetic medium and, in particular, to a spin valve sensor with multiple antiparallel coupling layers in the pinned layer for improved bias properties.

2. Description of Related Art

Computers often include auxiliary memory storage devices having media on which data can be written and from which data can be read for later use. A direct access storage device (disk drive) incorporating rotating magnetic disks is commonly used for storing data in magnetic form on the disk surfaces. Data is recorded on concentric, radially spaced tracks on the disk surfaces. Magnetic heads including read sensors are then used to read data from the tracks on the disk surfaces.

In high capacity disk drives, magnetoresistive (MR) read sensors, commonly referred to as MR sensors, are the prevailing read sensors because of their capability to read data from a surface of a disk at greater track and linear densities than thin film inductive heads. An MR sensor detects a magnetic field through the change in the resistance of its MR sensing layer (also referred to as an "MR element") as a function of the strength and direction of the magnetic flux being sensed by the MR layer.

The conventional MR sensor operates on the basis of the anisotropic magnetoresistive (AMR) effect in which an MR element resistance varies as the square of the cosine of the angle between the magnetization in the MR element and the direction of sense current flowing through the MR element. Recorded data can be read from a magnetic medium because the external magnetic field from the recorded magnetic medium (the signal field) causes a change in the direction of magnetization in the MR element, which in turn causes a change in resistance in the MR element and a corresponding change in the sensed current or voltage.

Another type of MR sensor is the giant magnetoresistance (GMR) sensor manifesting the GMR effect. In GMR sensors, the resistance of the MR sensing layer varies as a function of the spin-dependent transmission of the conduction electrons between magnetic layers separated by a non-magnetic layer (spacer) and the accompanying spin-dependent scattering which takes place at the interface of the magnetic and non-magnetic layers and within the magnetic layers.

GMR sensors using only two layers of ferromagnetic material (e.g., Ni—Fe) separated by a layer of non-magnetic material (e.g., copper) are generally referred to as spin valve (SV) sensors manifesting the SV effect. FIG. 1 shows a prior art SV sensor 100 comprising end regions 104 and 106 separated by a central region 102. A first ferromagnetic layer, referred to as a pinned layer 120, has its magnetization typically fixed (pinned) by exchange coupling with an antiferromagnetic (AFM) layer 125. The magnetization of a second ferromagnetic layer, referred to as a free layer 110, is not fixed and is free to rotate in response to the magnetic field from the recorded magnetic medium (the signal field). The free layer 110 is separated from the pinned layer 120 by a non-magnetic, electrically conducting spacer layer 115. Leads 140 and 145 formed in the end regions 104 and 106, respectively, provide electrical connections for sensing the resistance of SV sensor 100. IBM's U.S. Pat. No. 5,206,590 granted to Dieny et al., incorporated herein by reference, discloses a SV sensor operating on the basis of the GMR effect.

Another type of SV sensor is an antiparallel (AP)-pinned SV sensor. In AP-pinned SV sensors, the pinned layer is a laminated structure of two ferromagnetic layers separated by a non-magnetic coupling layer such that the magnetizations of the two ferromagnetic layers are strongly coupled together antiferromagnetically in an antiparallel orientation. The AP-pinned SV sensor provides improved exchange coupling of the antiferromagnetic (AFM) layer to the laminated pinned layer structure than is achieved with the pinned layer structure of the SV sensor of FIG. 1. This improved exchange coupling increases the stability of the AP-pinned SV sensor at high temperatures which allows the use of corrosion resistant and electrically insulating antiferromagnetic materials such as NiO for the AFM layer.

Referring to FIG. 2, an AP-pinned SV sensor 200 comprises a free layer 210 separated from a laminated AP-pinned layer structure 220 by a nonmagnetic, electrically-conducting spacer layer 215. The magnetization of the laminated AP-pinned layer structure 220 is fixed by an AFM layer 230. The laminated AP-pinned layer structure 220 comprises a first ferromagnetic layer 226 and a second ferromagnetic layer 222 separated by an antiparallel coupling (APC) layer 224 of nonmagnetic material (usually ruthenium (Ru)). The two ferromagnetic layers 226, 222 (FM1 and FM2) in the laminated AP-pinned layer structure 220 have their magnetization directions oriented antiparallel, as indicated by the arrows 227, 223 (arrows pointing out of and into the plane of the paper respectively).

The transfer curve (readback signal of the spin valve head versus applied signal from the magnetic disk) for a spin valve is linear and is defined by $\sin \theta$ where $\theta$ is the angle between the directions of the magnetic moments of the free and pinned layers. FIG. 3a is an exemplary transfer curve for a spin valve sensor having a bias point (operating point) 300 at the midpoint of the transfer curve, at which point the positive and negative readback signals $V_1$ and $V_2$ (positive and negative changes in the GMR of the spin valve above and below the bias point) are equal (symmetrical) when sensing positive and negative fields having the same magnitude from the magnetic disk. FIGS. 3b and 3c illustrate transfer curves having bias points 302 and 304 shifted in the positive and negative directions, respectively, so that the readback signals $V_1$ and $V_2$ are asymmetrical with respect to the bias point.

The desirable symmetric bias transfer curve of FIG. 3a is obtained when the SV sensor is in its quiescent state (no magnetic signal from the disk) and the direction of the magnetic moment of the free layer is perpendicular to the magnetic moment of the pinned layer which is fixed substantially perpendicular to the disk surface. The bias point may be shifted from the midpoint of the transfer curve by various influences on the free layer which in the quiescent state can act to rotate its magnetic moment relative to the magnetic moment of the pinned layer.

The bias point is influenced by four major forces on the free layer, namely a ferromagnetic coupling field $H_{FC}$ between the pinned layer and the free layer, a demagnetization field $H_{demag}$ on the free layer from the pinned layer, a sense current field Hsc from all conductive layers of the spin valve except the free layer, and the AMR effect from the free layer which is also present in a spin valve sensor. The influence of the AMR on the bias point is the same as a magnetic influence thereon and can be defined in terms of magnitude and direction referred to herein as the AMR EFFECT. IBM's U.S. Pat. No. 5,828,529 to Gill, incorporated herein by reference, discloses an AP-pinned spin valve with bias point symmetry obtained by counterbalancing the combined influence of $H_{FC}$, $H_{demag}$ and $H_{SC}$ by the influence of the AMR EFFECT on the free layer.

A problem with the prior art sensors arises as the size of spin valve sensors is decreased in order to address the need for higher storage density disk files. The AMR effect in the thinner free layer decreases and therefore the AMR EFFECT is no longer sufficient to counterbalance the influences of $H_{FC}$, $H_{demag}$ and $H_{SC}$ resulting in a shift of the bias point toward a positive asymmetry. The asymmetric bias results in asymmetric readback signal response for positive and negative magnetic signals and to reduced signal output and dynamic range of the SV sensor.

Therefore there is a need for an SV sensor that provides a symmetric bias point on the transfer curve and improved signal output without sacrificing other desirable characteristics such as the strength of pinning of the pinned layer and in-file resettability of the antiferromagnetic layer.

SUMMARY OF THE INVENTION

Accordingly, it is an object of the present invention to disclose a spin valve sensor which provides high amplitude with near zero signal asymmetry while maintaining bias polarity for pinning and in-file resettability of the antiferromagnet.

It is another object of the present invention to disclose a spin valve sensor having an effectively thicker ruthenium layer while maintaining stronger antiparallel coupling.

It is a further object of the present invention to disclose a spin valve sensor having an effectively thicker ruthenium layer to increase the signal amplitude.

It is yet another object of the present invention to disclose a spin valve sensor having an AP-pinned structure with multiple ruthenium antiparallel coupling (APC) layers.

In accordance with the principles of the present invention, there is disclosed a preferred embodiment of the present invention wherein a spin valve sensor has a plurality of APC layers (e.g., ruthenium) interleaved between ferromagnetic pinned layers, in order to effectively increase the ruthenium thickness while avoiding a decrease in the antiferromagnetic coupling between ferromagnetic layers which would normally accompany a substantial increase in the thickness of a single ruthenium layer. In the preferred embodiment, the spin valve sensor has a laminated AP-pinned layer comprising two APC layers, preferably made of ruthenium, separating three ferromagnetic pinned layers. With this AP-pinned layer structure, the forces on the free layer that influence the bias point on the sensor transfer curve are oriented so that the combined effects of the demagnetization field $H_{demag}$ and the sense current field $H_{SC}$ are counterbalanced by the combined effects of the AMR EFFECT and the ferromagnetic coupling field $H_{FC}$ resulting in near zero asymmetry of the read signal.

When the SV sensor of the present invention is positioned asymmetrically between first and second shield layers, a net image field $H_{image}$ due to images of the free layer current in the first and second shields is present at the free layer and has an influence on the bias point on the transfer curve. With the center of the free layer positioned a greater distance from the nearest surface of the first shield than the distance of the center of the free layer from the nearest surface of the second shield, $H_{image}$ is in the same direction as $H_{FC}$ and the AMR EFFECT. The combined influences of $H_{image}$, $H_{FC}$ and the AMR EFFECT counterbalance the combined influences of $H_{demag}$ and $H_{SC}$ resulting in near zero asymmetry of the read signal.

The above, as well as additional objects, features and advantages of the present invention will become apparent in the following detailed written description.

BRIEF DESCRIPTION OF THE DRAWINGS

For a fuller understanding of the nature and advantages of the present invention, as well as the preferred mode of use, reference should be made to the following detailed description read in conjunction with the accompanying drawings. In the following drawings, like reference numerals designate like or similar parts throughout the drawings.

DETAILED DESCRIPTION OF THE PREFERRED EMBODIMENT

The following description is the best embodiment presently contemplated for carrying out the present invention. This description is made for the purpose of illustrating the general principles of the present invention and is not meant to limit the inventive concepts claimed herein.

Figure 4:
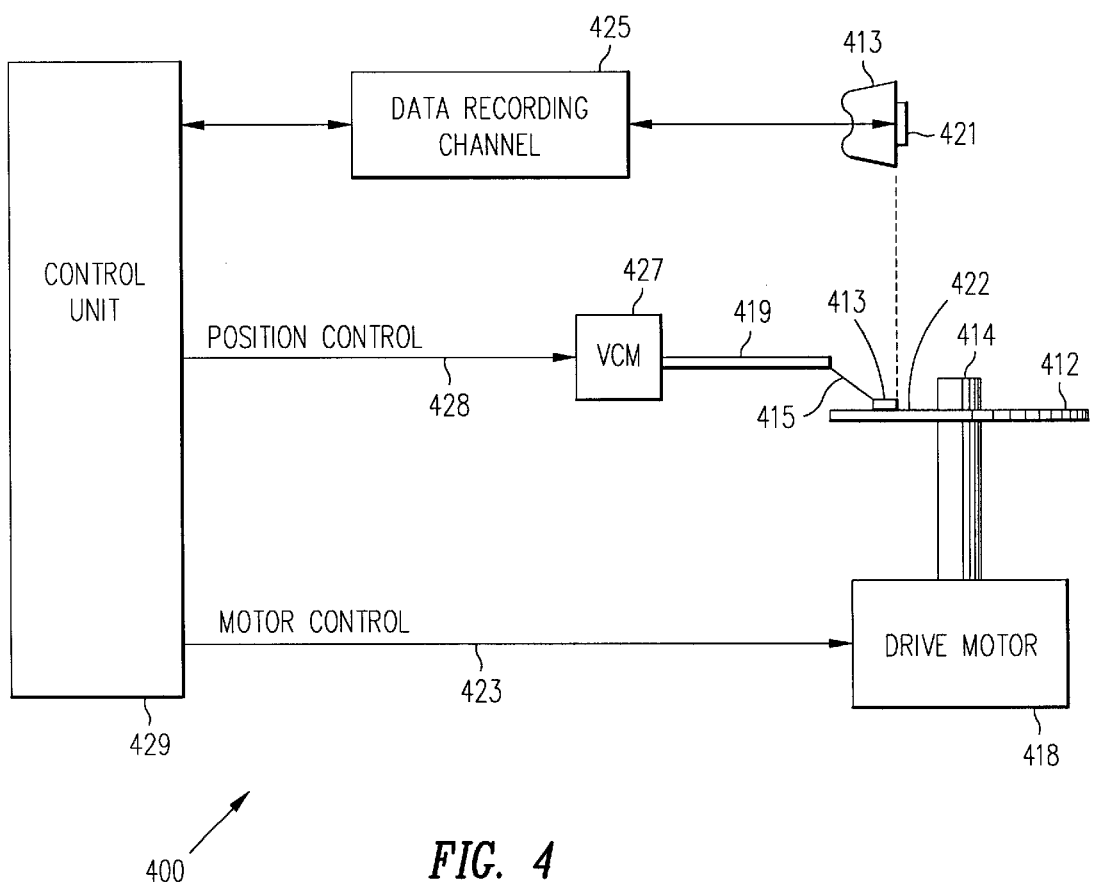
FIG. 4 is a block diagram of a magnetic recording disk drive system.

Referring now to FIG. 4, there is shown a disk drive 400 embodying the present invention. As shown in FIG. 4, at least one rotatable magnetic disk 412 is supported on a spindle 414 and rotated by a disk drive motor 418. The magnetic recording media on each disk is in the form of an annular pattern of concentric data tracks (not shown) on the disk 412.

At least one slider 413 is positioned on the disk 412, each slider 413 supporting one or more magnetic read/write heads 421 where the head 421 incorporates the SV sensor of the present invention. As the disks rotate, the slider 413 is moved radially in and out over the disk surface 422 so that the heads 421 may access different portions of the disk where desired data is recorded. Each slider 413 is attached to an actuator arm 419 by means of a suspension 415. The suspension 415 provides a slight spring force which biases the slider 413 against the disk surface 422. Each actuator arm 419 is attached to an actuator 427. The actuator as shown in FIG. 4 may be a voice coil motor (VCM). The VCM comprises a coil movable within a fixed magnetic field, the direction and speed of the coil movements being controlled by the motor current signals supplied by a controller 429.

During operation of the disk storage system, the rotation of the disk 412 generates an air bearing between the slider 413 (the surface of the slider 413 which includes the head 421 and faces the surface of the disk 412 is referred to as an air bearing surface (ABS)) and the disk surface 422 which exerts an upward force or lift on the slider. The air bearing thus counter-balances the slight spring force of the suspension 415 and supports the slider 413 off and slightly above the disk surface by a small, substantially constant spacing during normal operation.

The various components of the disk storage system are controlled in operation by control signals generated by the control unit 429, such as access control signals and internal clock signals. Typically, the control unit 429 comprises logic control circuits, storage chips and a microprocessor. The control unit 429 generates control signals to control various system operations such as drive motor control signals on line 423 and head position and seek control signals on line 428. The control signals on line 428 provide the desired current profiles to optimally move and position the slider 413 to the desired data track on the disk 412. Read and write signals are communicated to and from the read/write heads 421 by means of the data recording channel 425.

The above description of a typical magnetic disk storage system, and the accompanying illustration of FIG. 4 are for representation purposes only. It should be apparent that disk storage systems may contain a large number of disks and actuator arms, and each actuator arm may support a number of sliders.

Figure 5:
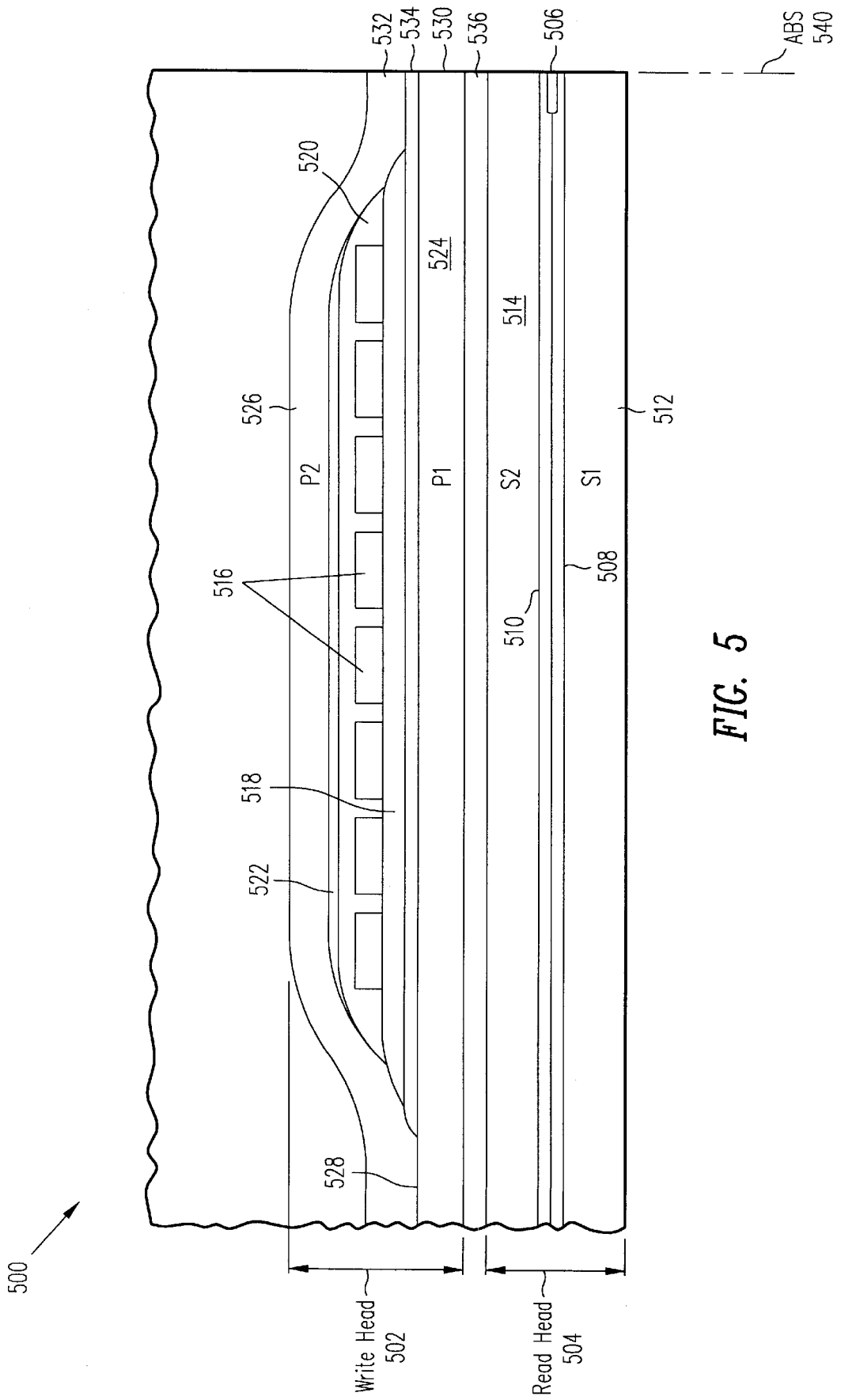
FIG. 5 is a vertical cross-section view (not to scale) of a "piggyback" read/write magnetic head.

FIG. 5 is a side cross-sectional elevation view of a "piggyback" magnetic read/write head 500, which includes a write head portion 502 and a read head portion 504, the read head portion employing a spin valve sensor 506 according to the present invention. The spin valve sensor 506 is sandwiched between nonmagnetic insulative first and second read gap layers 508 and 510, and the read gap layers are sandwiched between ferromagnetic first and second shield layers 512 and 514. In response to external magnetic fields, the resistance of the spin valve sensor 506 changes. A sense current $I_S$ conducted through the sensor causes these resistance changes to be manifested as potential changes. These potential changes are then processed as readback signals by the processing circuitry of the data recording channel 425 shown in FIG. 4.

The write head portion 502 of the magnetic read/write head 500 includes a coil layer 516 sandwiched between first and second insulation layers 518 and 520. A third insulation layer 522 may be employed for planarizing the head to eliminate ripples in the second insulation layer 520 caused by the coil layer 516. The first, second and third insulation layers are referred to in the art as an insulation stack. The coil layer 516 and the first, second and third insulation layers 518, 520 and 522 are sandwiched between first and second pole piece layers 524 and 526. The first and second pole piece layers 524 and 526 are magnetically coupled at a back gap 528 and have first and second pole tips 530 and 532 which are separated by a write gap layer 534 at the ABS 540. An insulation layer 536 is located between the second shield layer 514 and the first pole piece layer 524. Since the second shield layer 514 and the first pole piece layer 524 are separate layers this read/write head is known as a "piggyback" head.

Figure 6:
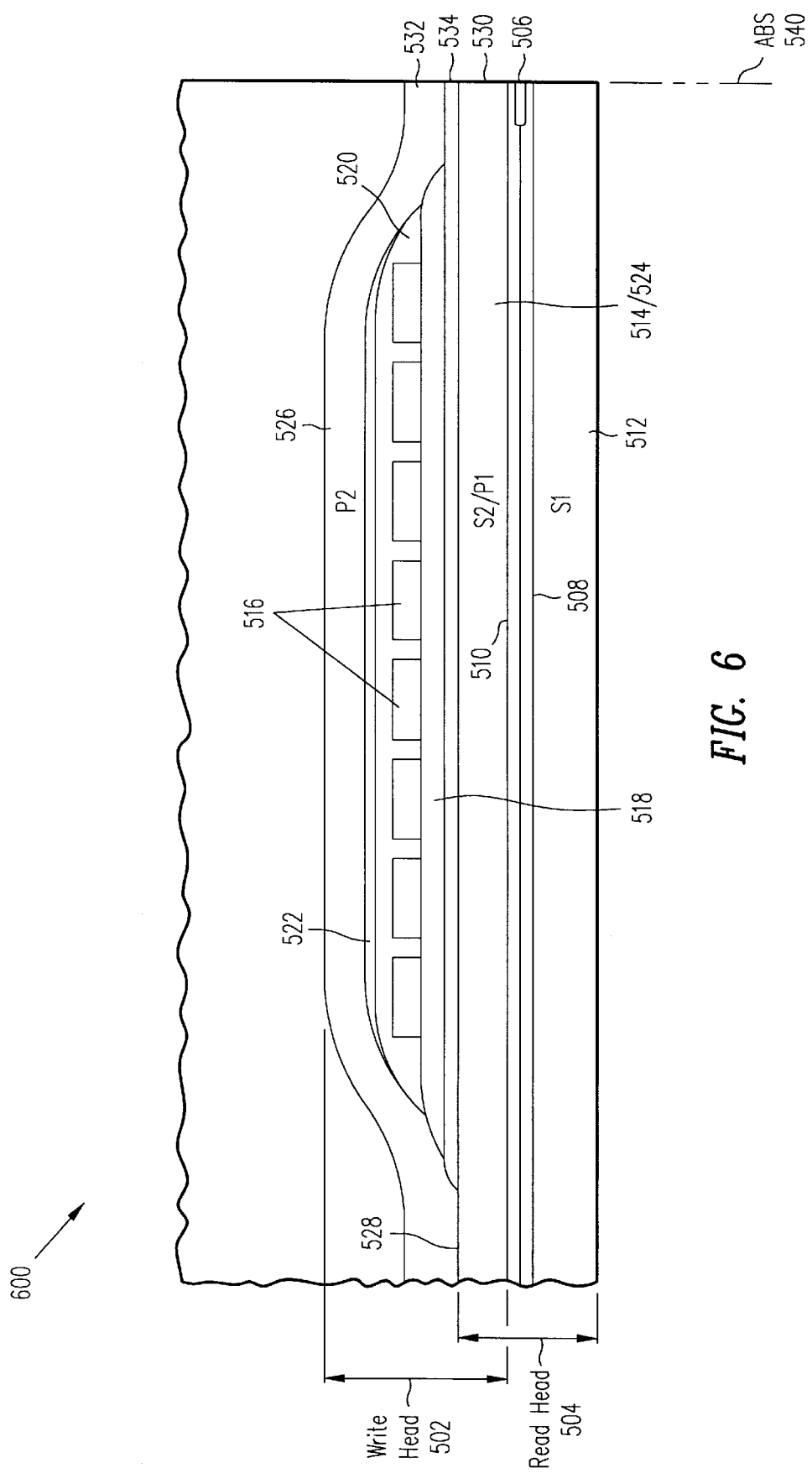
FIG. 6 is a vertical cross-section view (not to scale) of a "merged" read/write magnetic head.

FIG. 6 is the same as FIG. 5 except the second shield layer 514 and the first pole piece layer 524 are a common layer. This type of read/write head is known as a "merged" head 600. The insulation layer 536 of the piggyback head in FIG. 5 is omitted in the merged head 600 of FIG. 6.

Figure 7:
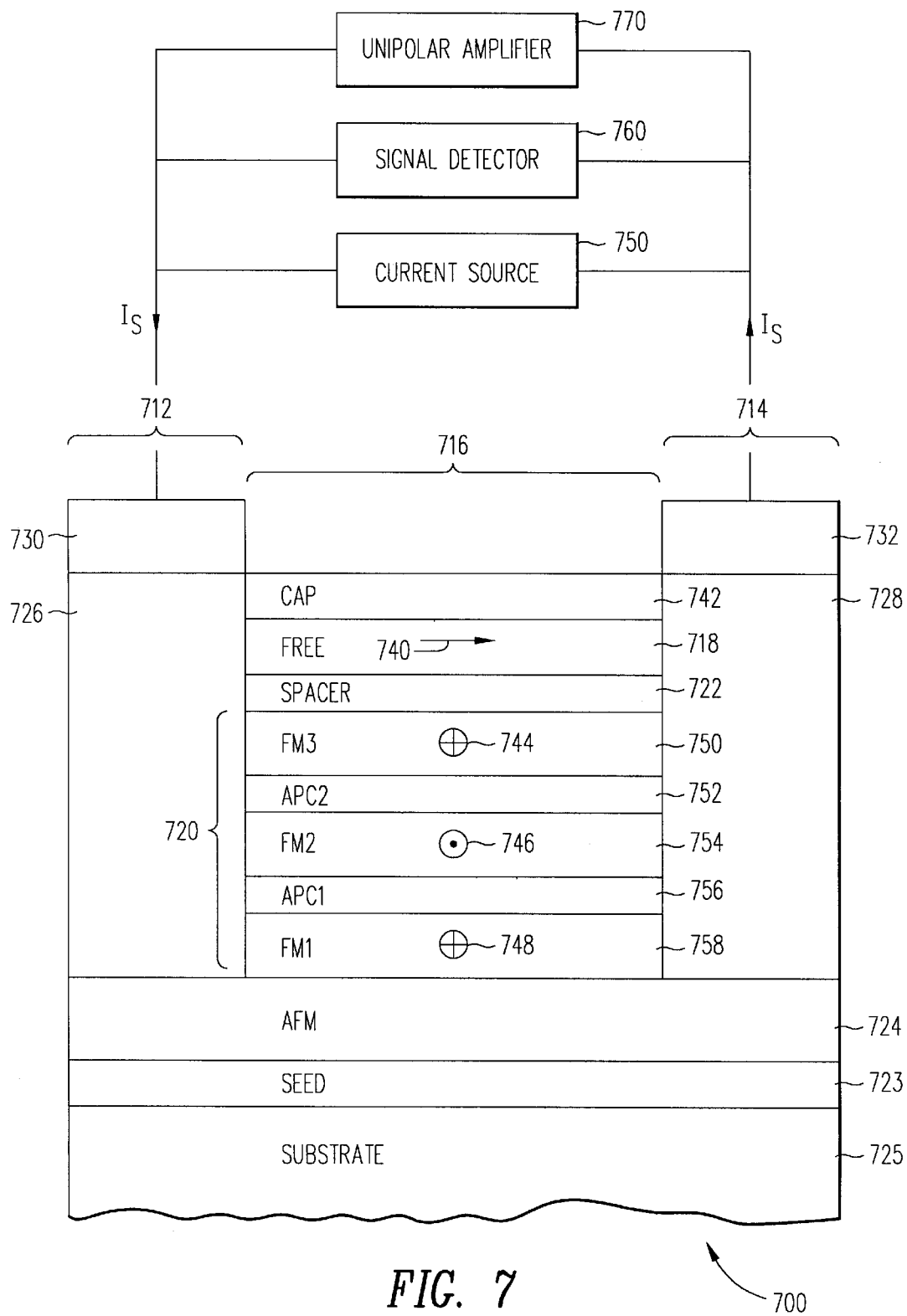
FIG. 7 is an air bearing surface view (not to scale) of the improved spin valve sensor of the present invention.

FIG. 7 shows an air bearing surface (ABS) view of an antiparallel (AP)-pinned spin valve (SV) sensor 700 according to the preferred embodiment of the present invention. The SV sensor 700 comprises end regions 712 and 714 separated from each other by a central region 716. The substrate 725 can be any suitable substance, including glass, semiconductor material, or a ceramic material, such as alumina ($Al_2O_3$). The seed layer 723 is a layer deposited to modify the crystallographic texture or grain size of the subsequent layers, and may not be needed depending on the material of the subsequent layer. If used the seed layer may be formed of tantalum (Ta), zirconium (Zr), nickel-iron (Ni—Fe), or $Al_2O_3$. An antiferromagnetic (AFM) layer 724 is deposited over seed layer 723 to the thickness at which the desired exchange properties are achieved, typically 200–500 Å. A laminated AP-pinned layer 720 is formed on the AFM layer 724 in the central region 716. A free layer (free ferromagnetic layer) 718 is separated from the pinned layer 720 by a nonmagnetic, electrically conducting spacer layer 722. The magnetization of the free layer 718 is preferably parallel to the ABS in the absence of an external field as indicated by the arrow 740. A cap layer 742 formed on the free layer 718, completes the central region 716 of the SV sensor 700. In the present embodiment, the cap layer 742 is formed of tantalum (Ta).

As can be seen in the view of FIG. 7, the AP-pinned layer 720 comprises a first ferromagnetic pinned layer (FM1) 758, a second ferromagnetic pinned layer (EM2) 754, and a third ferromagnetic pinned layer (FM3) 750. The FM1 layer 758 and the M2 layer 754 are separated by a first antiparallel coupling (APC1) layer 756. Similarly, the FM2 layer 754 and the FM3 layer 750 are separated by a second antiparallel coupling (APC2) layer 752. The APC1 layer 756 and the APC2 layer 752 are formed of a nonmagnetic material, preferably ruthenium (Ru), that allows the FM1 layer 758, FM2 layer 754 and the FM3 layer 750 to be strongly coupled together antiferromagnetically.

The SV sensor 700 further comprises layers 726 and 728 formed on the end regions 712 and 714, respectively, for providing a longitudinal bias field to the free layer 740 to ensure a single magnetic domain state in the free layer. Lead layers 731 and 732 are also deposited on the end regions 712 and 714, respectively, to provide electrical connections for the flow of a sensing current $I_s$ from a current source 750 to the SV sensor 700. A signal detector 760 which is electrically connected to leads 731 and 732 senses the change in resistance due to changes induced in the free layer 718 by the external magnetic field (e.g., field generated by a data bit stored on a disk). The external magnetic field acts to rotate the direction of magnetization of the free layer 718 relative to the direction of magnetization of the pinned layer 720 which is preferably pinned perpendicular to the ABS. The signal detector 760 preferably comprises a partial response maximum likelihood (PRML) recording channel for processing the signal detected by SV sensor 700. Alternatively, a peak detect channel or a maximum likelihood channel (e.g., 1,7 ML) may be used. The design and implementation of the aforementioned channels are known to those skilled in the art. The signal detector 760 also includes other supporting circuitries such as a preamplifier (electrically placed between the sensor and the channel) for conditioning the sensed resistance changes as is known to those skilled in the art.

The SV sensor 700 is fabricated in a magnetron sputtering or an ion beam sputtering system to sequentially deposit the multilayer structure shown in FIG. 7. The sputter deposition process is carried out in the presence of a transverse magnetic field of about 40 Oe. The AFM layer 724 formed of NiO, generally having a thickness in the range of 200–500 Å and preferably having a thickness of about 400 Å, is directly deposited on an $Al_2O_3$ substrate layer 725 by sputtering a nickel target in the presence of a reactive gas that includes oxygen.

The FM1 layer 758 is formed of Ni—Fe (permalloy) having a thickness in the range of 5–30 Å deposited on the AFM layer 724. The APC1 layer 756 is formed of Ru having a thickness of about 6 Å deposited on the EM1 layer 758. The FM2 layer 754 is formed of NiFe having a thickness in the range of 5–30 Å deposited on the APC1 layer 756. The APC2 layer 752 is formed of Ru having a thickness of about 6 Å deposited on the FM2 layer 754. The FM3 layer 750 is formed of cobalt (Co) having a thickness in the range of 10–30 Å deposited on the APC2 layer 752. Alternatively, the FM1 layer 758 and the FM2 layer 754 may be formed of FeCo. The thicknesses of the FM1, FM2 and FM3 layers 758, 754 and 750 are selected to achieve a net magnetic thickness of the pinned layer 720 equivalent to about 10 Å of NiFe.

The nonmagnetic, conducting spacer layer 722 is formed of copper (Cu) having a thickness of about 20 Å deposited on the FM3 layer 750. The free layer 718 is formed of NiFe having a thickness in the range of 20–50 Å deposited on the spacer layer 722. The cap layer 742 is formed of Ta having a thickness in the range of 20–50 Å deposited on the free layer 718.

After the deposition of the central portion 716 is completed, the sensor is annealed in the presence of a magnetic field of about 800 Oe oriented in the transverse direction to the ABS and is then cooled while still in the magnetic field to set the exchange coupling of the AFM layer 724 with the laminated pinned layer 720 transverse to the ABS. The FM1 layer 758 has a surface which interfaces with a surface of the AFM layer 724 so that the AFM layer pins the magnetic moment 748 (represented in FIG. 7 by the tail of an arrow pointing into the plane of the paper) of the FM1 layer 758 in a direction perpendicular to and away from the ABS. The moment of the FM1 layer 758 is pinned in this direction by exchange coupling with the AFM layer 724. The APC1 layer 756 is very thin (about 6 Å) which allows an antiferromagnetic exchange coupling between the FM1 layer 758 and the FM2 layer 754. Accordingly, the magnetic moment 746 (represented by the head of an arrow pointing out of the plane of the paper) of the FM2 layer 754 is directed in an opposite direction to the magnetic moment 748 of the FM1 layer 758, namely perpendicular to and towards the ABS. Similarly, the APC2 layer 752 allows an antiferromagnetic exchange coupling between the FM2 layer 754 and the FM3 layer 750. The magnetic moment 744 of the FM3 layer 750 is directed in an opposite direction to the magnetic moment 746 of the FM2 layer 754, namely perpendicular to and away from the ABS.

Figure 8:
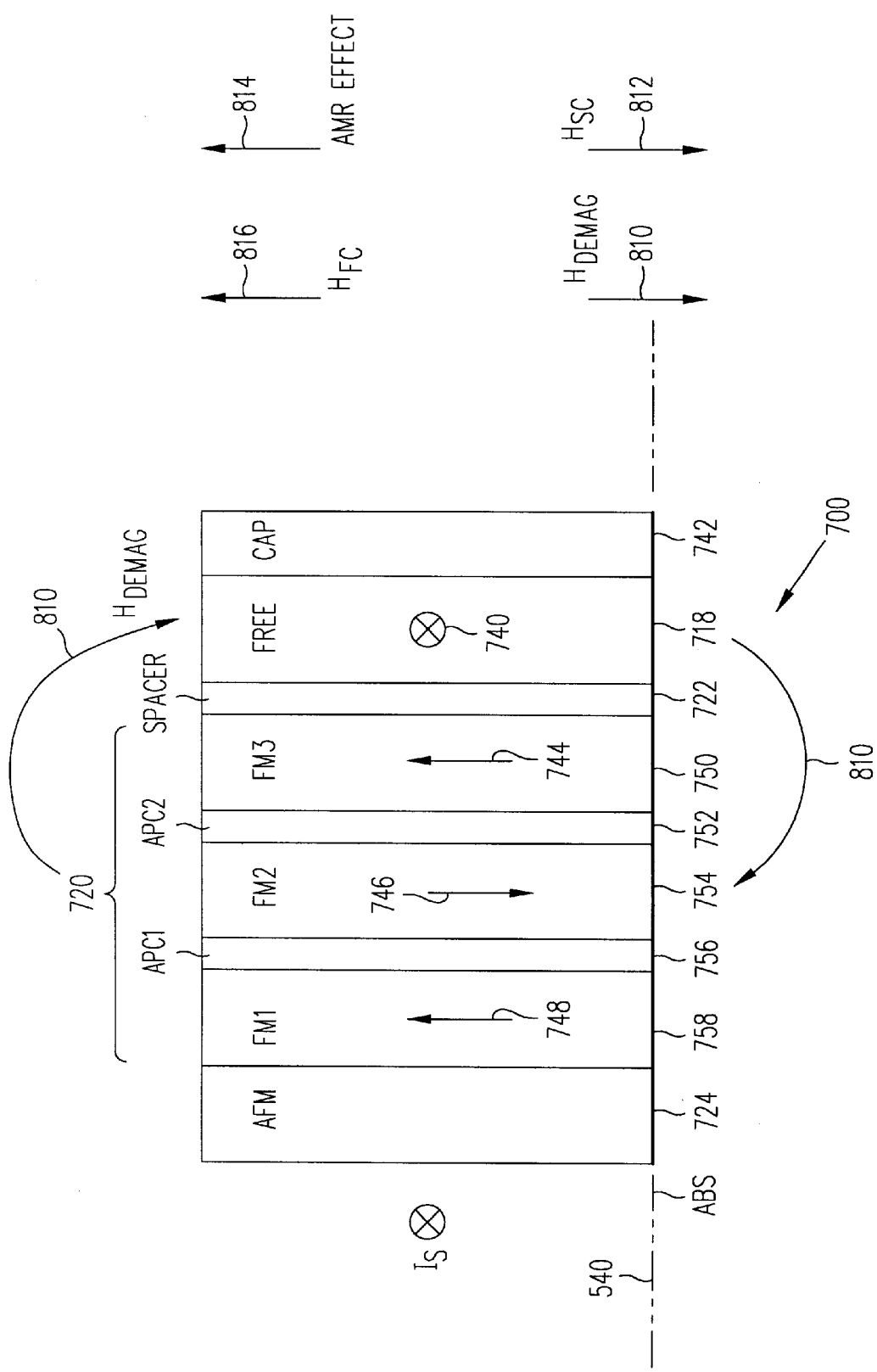
FIG. 8 is a side cross-section view (not to scale) of the improved spin valve sensor of the present invention.

FIG. 8 is a side cross-sectional view perpendicular to the ABS 540 of the SV sensor 700 of the present invention. The thicknesses of the FM1, FM2 and FM3 layers 758, 754 and 750 determine the net magnetic moment of the AP-pinned layer 720 and are chosen so that the net magnetic moment of the AP-pinned layer 720 is approximately equivalent to 10 Å of NiFe directed perpendicular to and away from the ABS 540. The small magnitude of the net magnetic moment promotes strong antiferromagnetic coupling of the pinned layer 720 to the AFM layer 724 leading to good thermal stability of the SV sensor 700. The direction of the net magnetic moment of the pinned layer 720 is important in achieving the desired symmetric bias point for operation of the SV sensor 700 of the present invention to be described in detail hereafter. The FM1 layer 758 has a preferred thickness in the range of 15–30 Å, the FM2 layer 754 has a preferred thickness in the range of 15–30 Å, and the FM1 layer 750 has a preferred equivalent thickness of NiFe in the range of 15–30 Å in the present embodiment of the invention.

Various influences on the free layer 718 and consequently various influences on the bias point of the transfer curve for the SV sensor 700 are shown in FIG. 8. The influences on the magnetic moment 740 of the free layer 718 are $H_{demag}$ 810, $H_{FC}$ 816, the AMR EFFECT 814, and $H_{SC}$ 812. $H_{demag}$ 810 is due to the net moment of the AP-pinned layer 720, $H_{FC}$ 816 is due to a ferromagnetic coupling between the free layer 718 and the FM3 layer 750, the AMR EFFECT 814 is due to an AMR effect which is proportional to the thickness of the free layer 718, and $H_{SC}$ 812 is the net sense current field on the free layer due to conduction of the sense current through the layers 758, 756, 754, 752, 750 and 722.

Figure 1:
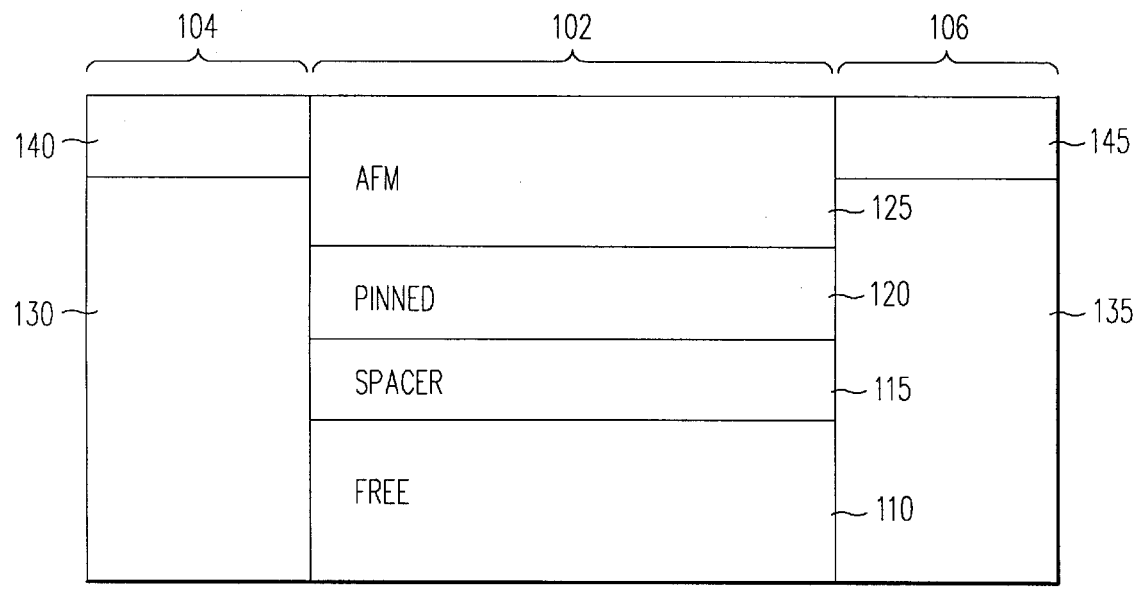
FIG. 1 is an air bearing surface view, not to scale, of a prior art SV sensor.
Figure 2:
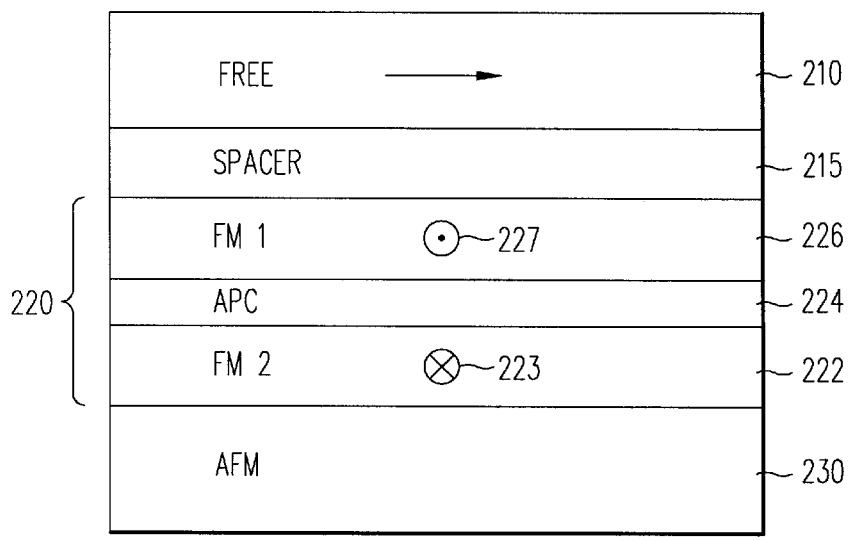
FIG. 2 is an air bearing surface view, not to scale, of a prior art AP-pinned SV sensor.
Figure 3C:
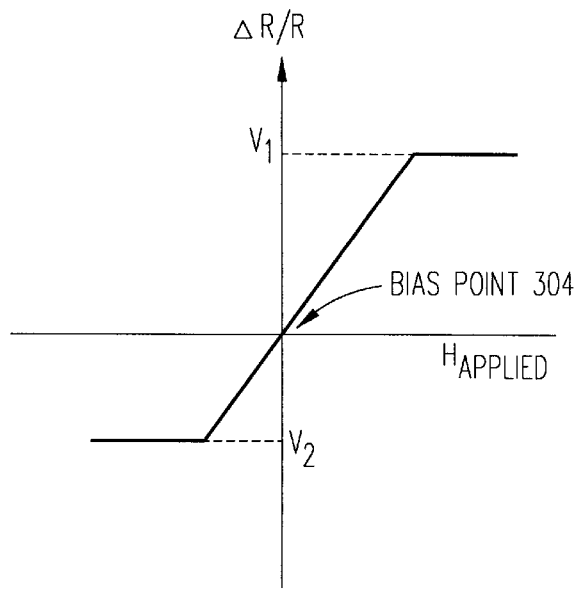
FIG. 3c is a transfer curve for a spin valve sensor having a bias point shifted in the negative direction of the transfer curve so that positive and negative readback signals are asymmetrical about the bias point.
Figure 3B:
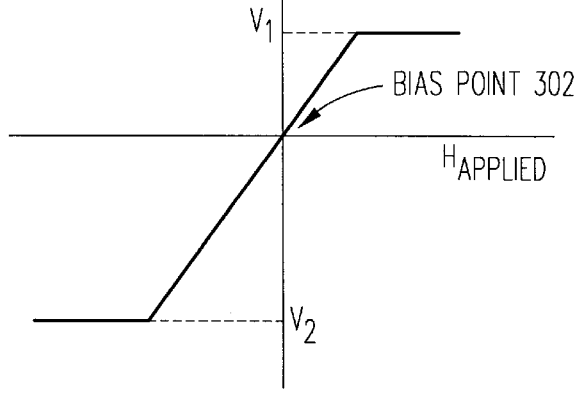
FIG. 3b is a transfer curve for a spin valve sensor having a bias point shifted in the positive direction of the transfer curve so that positive and negative readback signals are asymmetrical about the bias point.
Figure 3A:
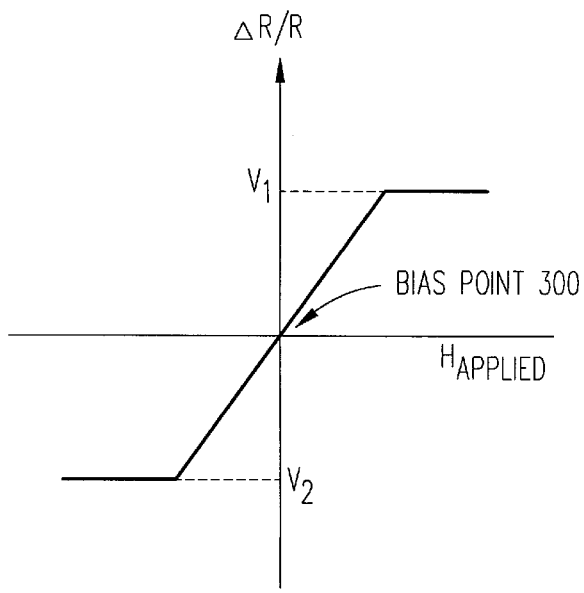
FIG. 3a is a transfer curve for a spin valve sensor having a bias point at the midpoint of the transfer curve so that positive and negative readback signals are symmetrical about a zero bias point.

An advantage of the SV sensor 700 is that the influences on the free layer 718 of the AMR EFFECT 814 and $H_{FC}$ 816 are in the same direction and opposite in direction to the influences of $H_{demag}$ 810 and $H_{SC}$ 812. Accordingly, the influences on the free layer 718 of the AMR EFFECT 814 and $H_{FC}$ 816 act to counterbalance the influence of $H_{demag}$ 810 and $H_{SC}$ 812. Referring to FIGS. 3a, 3b and 3c, the AMR EFFECT 814 and $H_{FC}$ 816 act on the free layer 718 so as to cause the bias point on the transfer curve to be shifted in the negative direction (as indicated by bias point 304 in FIG. 3c) causing an asymmetry so that positive readback signals $V_1$ will be greater than negative readback signals $V_2$. Conversely, $H_{demag}$ 810 and $H_{SC}$ 812 act on the free layer 718 so as to cause the bias point on the transfer curve to be shifted in the positive direction (as indicated by bias point 302 in FIG. 3b) causing an asymmetry so that negative readback signals $V_2$ will be greater than positive readback signals $V_1$. Due to the counterbalancing of the influences of the AMR EFFECT 814 and $H_{FC}$ 816 by the influences of $H_{demg}$ 810 and $H_{SC}$ 812, the resulting bias point on the transfer curve of the SV sensor 700 will be more nearly at the midpoint of the curve (as indicated by bias point 300 in FIG. 3a) resulting in a symmetric or nearly symmetric response to positive and negative readback signals. The net influence on the free layer of $H_{FC}$, $H_{demag}$ the AMR effect and $H_{SC}$ is considered to be substantially zero when the asymmetry of the readback signal response is less than ±10% (asymmetry is defined by $(V_1-V_2)/V_1 \times 100\%$ for $V_1 > V_2$ or by $(V_1-V_2)/V_2 \times 100\%$ for $V_2 > V_1$).

It should be noted that having a second Ru layer (APC2 752) and an additional ferromagnetic pinned layer (FM3 750) in the laminated AP-pinned layer 720 of the SV sensor 700 allows the direction of the ferromagnetic coupling field $H_{FC}$ 816 to be directed opposite to the two other fields $H_{SC}$ 812 and $H_{demag}$ 810. As a result, $H_{FC}$ 816 adds to the AMR EFFECT 814 to counterbalance the net effect of $H_{SC}$ 812 and $H_{demag}$ 810 to achieve near zero asymmetry. In the prior art AP-pinned SV sensor having a single Ru layer in the AP-pinned layer, $H_{FC}$ is in the same direction as $H_{SC}$ and $H_{demag}$ resulting in bias point asymmetry.

Referring back to FIG. 5, in the foregoing description, the free layer of SV sensor 506 has been assumed to be symmetrically located between the first shield 512 and the second shield 514. However, if the free layer of the SV sensor 506 is not equidistant from the first and second shields 512 and 514, a net image field $H_{image}$ from the first and second shields due to the free layer sense current acts on the magnetic moment of the free layer and may become a significant factor affecting the bias point of the transfer curve.

Figure 9:
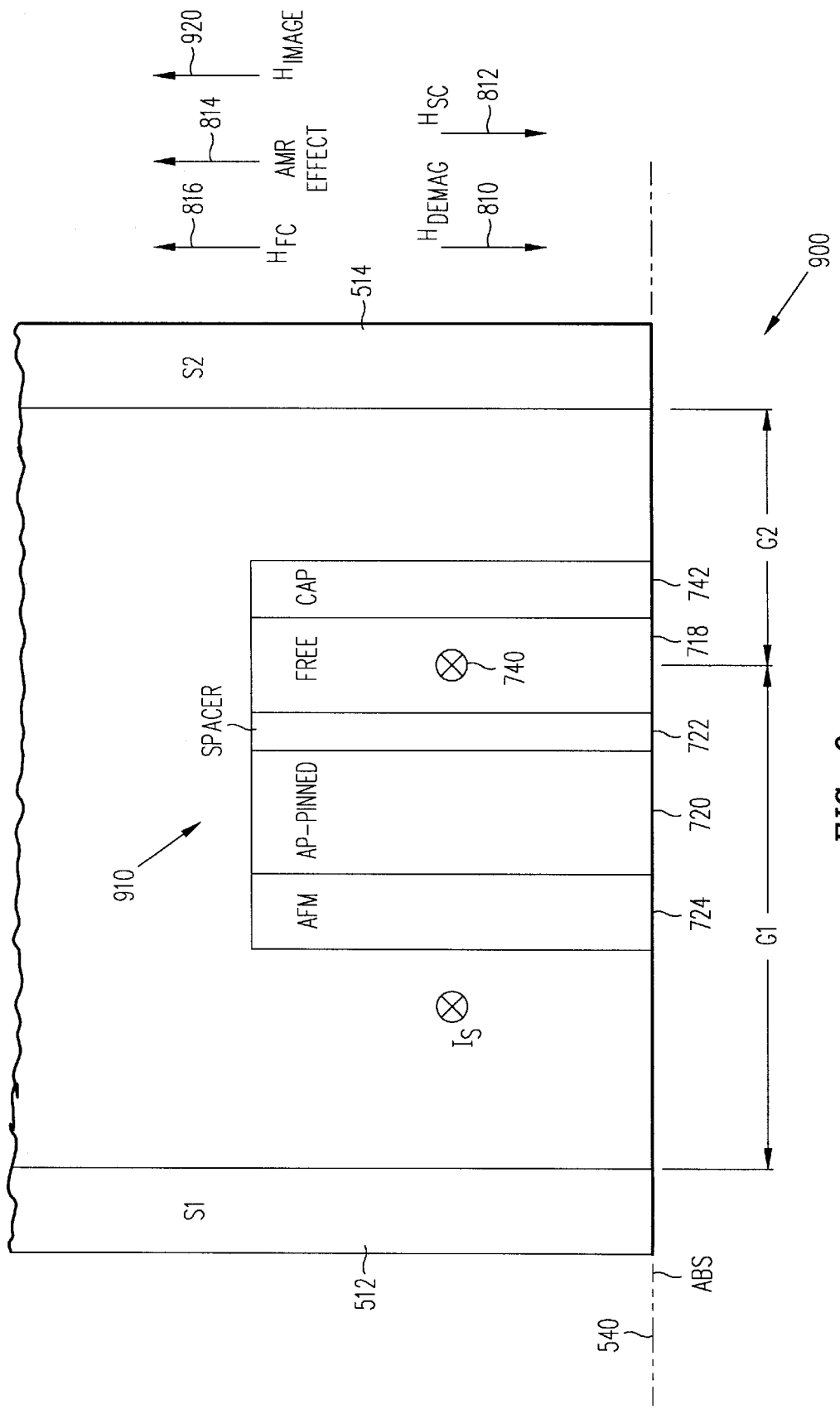
FIG. 9 is a vertical cross-section view (not to scale) of a read head portion of a read/write magnetic head with the improved spin valve sensor of the present invention.

FIG. 9 shows a read head 900 having an SV sensor 910 located asymmetrically within the gap between the first shield 512 and the second shield 514. The SV sensor 910 is positioned so that the center of the free layer 718 is a distance G1 from the nearest surface of the first shield 512 and a distance G2 from the nearest surface of the second shield 514. When G1=G2, the image field from the first shield 512 due to the current current flowing in the free layer 718 is cancelled by the image field from the second shield 514 due to the same current flowing in the free layer 718. However, when G1 is significantly larger than G2, a net image field $H_{image}$ 920 directed perpendicular to and away from the ABS 540 is present at the free layer 718. Accordingly, the influences on the free layer 718 of $H_{image}$ 920, $H_{FC}$ 816 and the AMR EFFECT 814 are in the same direction and opposite in direction to the influences of $H_{demag}$ 810 and $H_{SC}$ 812. The influences on the free layer 718 of $H_{image}$ 920, $H_{FC}$ 816 and the AMR EFFECT 814 act to counterbalance the influence of $H_{demag}$ 810 and $H_{SC}$ 812. The resulting bias point on the transfer curve of the SV sensor 910 will be nearly at the midpoint of the curve (as indicated by the bias point 300 in FIG. 3a) resulting in a nearly symmetric response to positive and negative readback signals. The influence of $H_{image}$ 920 in obtaining an exact or nearly exact counterbalance of the influences on the free layer 718 is particularly important when the AMR EFFECT 814 is small or negligible and G1 is approximately twice G2 so that the combined influences of Hinge 920 and $H_{FC}$ 816 are sufficient to counterbalance the combined influences of $H_{demag}$ 810 and $H_{SC}$ 812.

Another advantage of an AP-pinned layer having multiple Ru layers (antiparallel coupling layers) is that the resultant SV valve structure has greater total Ru layer thickness. It has been experimentally observed that as the Ru layer thickness increases, for example from 6 Å to 10 Å, read head amplitude increases by about 40%. However, with the usual AP-pinned SV sensor having a single APC layer formed of Ru, a thicker Ru layer results in a decrease of the antiferromagnetic coupling between the ferromagnetic pinned layers resulting in weaker pinning of the pinned layer magnetization. With the multiple Ru layer structure of the AP-pinned SV sensor 700 of the present invention, the effective Ru thickness is increased while maintaining strong antiferromagnetic coupling by limiting the thickness of individual APC layers formed of Ru to about 6 Å.

A further advantage of the SV sensor 700 of the present invention is that the sense current through the free layer 718 will cause a sense current field which is imposed on and increases the magnetic strength of the pinning moment 748 of the FM1 layer 758. This will promote thermal stability of the sensor from the standpoint that high temperature incursions due to contact with asperities on the rotating disk or electrostatic discharge from an object will not disorient the direction of the magnetic moment 748 until a higher temperature is reached. However, should this higher temperature be reached, which is referred to as the blocking temperature of the antiferromagnetic layer 724, there is provided a unipolar amplifier 770 for resetting the orientation of the antiferromagnetic layer 724 by conducting a resetting current $I_{reset}$ through the SV sensor 700. This current is of a higher magnitude than the sense current Is and typically would be three times Is for a very short period of time, such as 30 nanoseconds, to avoid overheating the antiferromagnetic layer 724. It should be noted that the direction of the reset current $I_{reset}$ is in the same direction as the sense current $I_s$. In-file resettability of the AFM layer 724 is an advantage of SV sensor 700 made possible by having the magnetic moment 748 of the FM1 layer 758 oriented in the same direction as the sense current field at the FM1 layer 758.

While the present invention has been particularly shown and described with reference to the preferred embodiments, it will be understood by those skilled in the art that various changes in form and detail may be made without departing from the spirit, scope and teaching of the invention. Accordingly, the disclosed invention is to be considered merely as illustrative and limited only as specified in the appended claims.

I claim:

1. A spin valve (SV) magnetoresistive sensor, comprising:
   an antiferromagnetic (AFM) layer;
   a spacer layer;
   an antiparallel (AP)-pinned layer disposed between the AFM layer and the spacer layer, said AP-pinned layer comprising at least two antiparallel coupling (APC) layers interleaved between ferromagnetic pinned layers; and
   a ferromagnetic free layer formed on the spacer layer.

2. The SV sensor as recited in claim 1, wherein said APC layers are formed of ruthenium (Ru).

3. The SV sensor as recited in claim 1, wherein said AP-pinned layer comprises two APC layers interleaved between three ferromagnetic pinned layers.

4. The SV sensor as recited in claim 1, wherein said AP-pinned layer comprises a plurality of APC layers interleaved between a plurality of ferromagnetic pinned layers.

5. The SV sensor as recited in claim 1, wherein said AP-pinned layer comprises:
   a first ferromagnetic (FM1) pinned layer deposited on the AFM layer;
   a second ferromagnetic (FM2) pinned layer;
   a first antiparallel coupling (APC1) layer disposed between the FM1 layer and the EM2 layer;
   a third ferromagnetic (FM3) pinned layer; and
   a second antiparallel coupling (APC2) layer disposed between the FM2 layer and the FM3 layer.

6. The SV sensor as recited in claim 5, wherein the FM1 and FM2 layers are made of permalloy (NiFe).

7. The SV sensor as recited in claim 5, wherein the FM3 layer is made of cobalt (Co).

8. The SV sensor as recited in claim 5, wherein the APC1 and APC2 layers are made of ruthenium (Ru).

9. The SV sensor as recited in claim 8, wherein the APC1 and APC2 layers have a thickness of about 6 Å.

10. The SV sensor as recited in claim 5, wherein the AFM layer is made of NiO.

11. A spin valve (SV) magnetoresistive sensor, comprising:
   an antiferromagnetic (AFM) layer;

a spacer layer;
an antiparallel (AP)-pinned layer disposed between the AFM layer and the spacer layer, said AP-pinned layer comprising:
a first ferromagnetic (FM1) pinned layer deposited on the AFM layer;
a second ferromagnetic (FM2) pinned layer;
a first antiparallel coupling (APC1) layer disposed between the FM1 layer and the FM2 layer;
a third ferromagnetic (FM3) pinned layer; and
a second antiparallel coupling (APC2) layer disposed between the FM2 layer and the FM3 layer; and
a ferromagnetic free layer formed on the spacer layer.

12. The SV sensor as recited in claim 11, wherein the FM1 and FM2 layers are made of permalloy (NiFe).

13. The SV sensor as recited in claim 11, wherein the FM3 layer is made of cobalt (Co).

14. The SV sensor as recited in claim 11, wherein the APC1 and APC2 layers are made of ruthenium (Ru).

15. The SV sensor as recited in claim 11, wherein the APC1 and APC2 layers each have a thickness of about 6 Å.

16. The SV sensor as recited in claim 11, wherein the AFM layer is made of NiO.

17. A spin valve (SV) magnetoresistive sensor which has positive and negative read signals about a bias point of a transfer curve upon sensing positive and negative magnetic incursions from a moving magnetic medium, said SV sensor comprising:
a ferromagnetic free layer having a magnetic moment which is free to rotate in first and second directions from a position which corresponds to said bias point upon sensing said positive and negative magnetic incursions, respectively;
an antiparallel pinned (AP)-layer having a magnetic moment that is pinned in a pinned direction, said AP-pinned layer including:
a first ferromagnetic (FM1) pinned layer;
a second ferromagnetic (FM2) pinned layer;
a first antiparallel coupling (APC1) layer disposed between the FM1 layer and the FM2 layer;
a third ferromagnetic (FM3) pinned layer; and
a second antiparallel coupling (APC2) layer disposed between the FM2 layer and the FM3 layer;
an antiferromagnetic (AFM) layer immediately adjacent said FM1 layer which pins the magnetic moment of the FM1 layer along said pinned direction or antiparallel thereto;
a nonmagnetic electrically conductive spacer layer disposed between the free layer and the FM3 layer so that upon sensing positive and negative magnetic incursions the magnetic moment of the free layer rotates in said first and second directions relative to the pinned direction of the magnetic moment of the AP-pinned layer resulting in an increase or decrease, respectively, in the magnetoresistance of the SV sensor to a sense current;
the direction of the magnetic moment of the free layer being influenced by a ferromagnetic coupling field ($H_{FC}$) from the FM3 layer, a demagnetization field ($H_{demag}$) from the AP-pinned layer, an anisotropic magnetoresistance effect (AMR EFFECT) and, upon applying a sense current, a net sense current field ($H_{SC}$) due to fields from electrically conductive layers of the SV sensor other than the free layer; and
said sense current having a predetermined direction and of such a magnitude that a net influence of $H_{FC}$, $H_{demag}$, the AMR EFFECT, and $H_{SC}$ on the free layer is substantially zero.

18. The SV sensor as recited in claim 17, wherein the direction of the influence of the AMR EFFECT and the direction of the field $H_{FC}$ are perpendicular to and away from an air bearing surface (ABS), and the direction of the fields $H_{demag}$ and $H_{SC}$ are perpendicular to and toward the ABS.

19. The SV sensor as recited in claim 17 wherein the AMR EFFECT has an influence on the free layer which is equivalent to a magnetic field which is parallel to the direction of the field $H_{FC}$ and antiparallel to the direction of the fields $H_{demag}$ and $H_{SC}$.

20. The SV sensor as recited in claim 17, wherein the direction of the magnetic moment of the free layer is influenced by an image field ($H_{image}$), a ferromagnetic coupling field ($H_{FC}$) from the FM3 layer, a demagnetization field ($H_{demag}$) from the AP-pinned layer, an anisotropic magnetoresistance effect (AMR EFFECT) and, upon applying said sense current, a net sense current field ($H_{SC}$) due to fields from electrically conductive layers of the SV sensor other than the free layer; and
said sense current having a predetermined direction and of such a magnitude that a net influence of $H_{image}$, $H_{FC}$, $H_{demag}$, (the AMR EFFECT, and $H_{SC}$ on the free layer is substantially zero.

21. A magnetic read/write head comprising:
a write head including:
at least one coil layer and an insulation stack, the coil layer being embedded in the insulation stack;
first and second pole piece layers connected at a back gap and having pole tips with edges forming a portion of an air bearing surface (ABS);
the insulation stack being sandwiched between the first and second pole piece layers; and
a write gap layer sandwiched between the pole tips of the first and second pole piece layers and forming a portion of the ABS;
a read head including:
a spin valve (SV) sensor, first and second gap layers, and first and second shield layers, the SV sensor being sandwiched between the first and second gap layers and the first and second gap layers being sandwiched between the first and second shield layers; the SV sensor including:
an antiferromagnetic (AFM) layer;
a spacer layer;
an antiparallel (AP)-pinned layer disposed between the AFM layer and the spacer layer, said AP-pinned layer comprising:
a first ferromagnetic (FM1) pinned layer deposited on the AFM layer;
a second ferromagnetic (FM2) pinned layer;
a first antiparallel coupling (APC1) layer disposed between the FM1 layer and the FM2 layer;
a third ferromagnetic (FM3) pinned layer; and
a second antiparallel coupling (APC2) layer disposed between the FM2 layer and the FM3 layer;
a ferromagnetic free layer formed on the spacer layer; and
an insulation layer disposed between the second shield layer of the read head and the first pole piece layer of the write head.

22. The magnetic read/write head as recited in claim 21, wherein the FM1 and FM2 layers are made of permalloy (NiFe).

23. The magnetic read/write head as recited in claim 21, wherein the FM3 layer is made of cobalt (Co).

24. The magnetic read/write head as recited in claim 21, wherein the APC1 and APC2 layers are made of ruthenium (Ru).

25. The magnetic read/write head as recited in claim 24, wherein the APC1 and APC2 layers each have a thickness of about 6 Å.

26. The magnetic read/write head as recited in claim 21, wherein the AFM layer is made of NiO.

27. A magnetic read/write head comprising:
a write head including:
at least one coil layer and an insulation stack, the coil layer being embedded in the insulation stack;
first and second pole piece layers connected at a back gap and having pole tips with edges forming a portion of an air bearing surface (ABS);
the insulation stack being sandwiched between the first and second pole piece layers; and
a write gap layer sandwiched between the pole tips of the first and second pole piece layers and forming a portion of the ABS;
a read head including:
a spin valve (SV) sensor, first and second gap layers, and first and second shield layers, the SV sensor being sandwiched between the first and second gap layers and the first and second gap layers being sandwiched between the first and second shield layers; the SV sensor having positive and negative read signals about a bias point of a transfer curve upon sensing positive and negative magnetic incursions from a moving magnetic medium, said SV sensor comprising:
a ferromagnetic free layer having a magnetic moment which is free to rotate in first and second directions from a position which corresponds to said bias point upon sensing said positive and negative magnetic incursions, respectively;
an antiparallel pinned (AP)-layer having a magnetic moment that is pinned in a pinned direction, said AP-pinned layer including:
a first ferromagnetic (FM1) pinned layer;
a second ferromagnetic (FM2) pinned layer;
a first antiparallel coupling (APC1) layer disposed between the FM1 layer and the FM2 layer;
a third ferromagnetic (FM3) pinned layer; and
a second antiparallel coupling (APC2) layer disposed between the FM2 layer and the FM3 layer;
an antiferromagnetic (AFM) layer immediately adjacent said FM1 layer which pins the magnetic moment of the FM1 layer along said pinned direction or antiparallel thereto;
a nonmagnetic electrically conductive spacer layer disposed between the free layer and the FM3 layer so that upon sensing positive and negative magnetic incursions the magnetic moment of the free layer rotates in said first and second directions relative to the pinned direction of the magnetic moment of the AP-pinned layer resulting in an increase or decrease, respectively, in the magnetoresistance of the SV sensor to a sense current;
the direction of the magnetic moment of the free layer being influenced by a ferromagnetic coupling field ($H_{FC}$) from the FM3 layer, a demagnetization field ($H_{demag}$) from the AP-pinned layer, an anisotropic magnetoresistance effect (AMR EFFECT) and, upon applying a sense current, a net sense current field ($H_{SC}$) due to field from electrically conductive layers of the SV sensor other than the free layer;
said sense current having a predetermined direction and of such a magnitude that a net influence of $HF_c$, $H_{demag}$, the AMR EFFECT, and $H_{SC}$ on the free layer is substantially zero; and
an insulation layer disposed between the second shield layer of the read head and the first pole piece layer of the write head.

28. The magnetic read/write head as recited in claim 27, wherein the direction of the influence of the AMR EFFECT and the direction of the field $H_{FC}$ are perpendicular to and away from an air bearing surface (ABS), and the direction of the fields $H_{demag}$ and $H_{SC}$ are perpendicular to and toward the ABS.

29. The magnetic read/write head as recited in claim 27 wherein the AMR EFFECT has an influence on the free layer which is equivalent to a magnetic field which is parallel to the direction of the field $H_{FC}$ and antiparallel to the direction of the fields $H_{demag}$ and $H_{SC}$.

30. The magnetic read/write head as recited in claim 27, wherein the direction of the magnetic moment of the free layer is influenced by an image field ($H_{image}$), a ferromagnetic coupling field ($H_{FC}$) from the FM3 layer, a demagnetization field ($H_{demag}$) from the AP-pinned layer, an anisotropic magnetoresistance effect (AMR EFFECT) and, upon applying said sense current, a net sense current field ($H_{SC}$) due to fields from electrically conductive layers of the SV sensor other than the free layer; and said current source for applying the sense current in a predetermined direction and of such a magnitude that a net influence of $H_{image}$, $H_{FC}$, $H_{demag}$, the AMR EFFECT, and $H_{SC}$ on the free layer is substantially zero.

31. A disk drive system comprising:
a magnetic recording disk;
a magnetic read/write head for magnetically recording data on the magnetic recording disk and for sensing magnetically recorded data on the magnetic recording disk, said magnetic read/write head comprising:
a write head including:
at least one coil layer and an insulation stack, the coil layer being embedded in the insulation stack;
first and second pole piece layers connected at a back gap and having pole tips with edges forming a portion of an air bearing surface (ABS);
the insulation stack being sandwiched between the first and second pole piece layers; and
a write gap layer sandwiched between the pole tips of the first and second pole piece layers and forming a portion of the ABS;
a read head including:
a spin valve (SV) sensor, first and second gap layers, and first and second shield layers, the SV sensor being sandwiched between the first and second gap layers and the first and second gap layers being sandwiched between the first and second shield layers; the SV sensor including:
an antiferromagnetic (AFM) layer;
a spacer layer;
an antiparallel (AP)-pinned layer disposed between the AFM layer and the spacer layer, said AP-pinned layer comprising:
a first ferromagnetic (FM1) pinned layer deposited on the AFM layer;
a second ferromagnetic (FM2) pinned layer;
a first antiparallel coupling (APC1) layer disposed between the FM1 layer and the FM2 layer;

a third ferromagnetic (FM3) pinned layer; and
a second antiparallel coupling (APC2) layer disposed between the FM2 layer and the FM3 layer;
a ferromagnetic free layer formed on the spacer layer;
an insulation layer disposed between the second shield layer of the read head and the first pole piece layer of the write head;
an actuator for moving said magnetic read/write head across the magnetic disk so that the read/write head may access different regions of the magnetic recording disk; and
a recording channel coupled electrically to the write head for magnetically recording data on the magnetic recording disk and to the SV sensor of the read head for detecting changes in resistance of the SV sensor caused by rotation of the magnetization axis of the free ferromagnetic layer relative to the fixed magnetization of the AP-pinned layer in response to magnetic fields from the magnetically recorded data.

32. The disk drive system as recited in claim 31, wherein the FM1 and EM2 layers are made of permalloy (NiFe).

33. The disk drive system as as recited in claim 31, wherein the FM3 layer is made of cobalt (Co).

34. The disk drive system as recited in claim 31, wherein the APC1 and APC2 layers are made of ruthenium (Ru).

35. The disk drive system as recited in claim 31, wherein the APC1 and APC2 layers each have a thickness of about 6 Å.

36. The disk drive system as recited in claim 31, wherein the AFM layer is made of NiO.

* * * * *